(12) United States Patent
Alawadi

(10) Patent No.: US 8,449,726 B2
(45) Date of Patent: May 28, 2013

(54) SOLAR THERMAL SYSTEM FOR THE PARTIAL DESALINATION OF SEAWATER AND ELECTRICAL ENERGY

(76) Inventor: Fahad Alawadi, Qurtuba (KW)

( * ) Notice: Subject to any disclaimer, the term of this patent is extended or adjusted under 35 U.S.C. 154(b) by 310 days.

(21) Appl. No.: 12/826,898

(22) Filed: Jun. 30, 2010

(65) Prior Publication Data

US 2012/0000762 A1   Jan. 5, 2012

(51) Int. Cl.
*B01D 3/00* (2006.01)

(52) U.S. Cl.
USPC ...... 202/167; 202/106; 203/10; 203/DIG. 17; 60/641.8; 60/641.9; 60/641.15

(58) Field of Classification Search
CPC .................................................... C02F 10/44
USPC ............... 203/10–11, DIG. 17; 202/81–167; 165/48.2; 60/641.8–641.15
See application file for complete search history.

(56) References Cited

U.S. PATENT DOCUMENTS

| | | | |
|---|---|---|---|
| 2,505,622 A | | 4/1950 | McKee |
| 4,037,652 A | | 7/1977 | Brugger |
| 4,132,074 A | * | 1/1979 | Wendel ......................... 60/641.8 |
| 4,164,933 A | * | 8/1979 | Alosi ............................. 126/621 |
| 4,199,407 A | * | 4/1980 | Diggs ........................... 202/176 |
| 4,203,805 A | * | 5/1980 | Diggs ........................... 202/176 |
| 4,211,609 A | * | 7/1980 | Diggs ........................... 202/176 |
| 4,230,531 A | * | 10/1980 | Fernandopulle .............. 202/180 |
| 4,292,136 A | * | 9/1981 | Clavier ......................... 202/234 |
| 5,622,605 A | * | 4/1997 | Simpson et al. ................ 203/10 |
| 6,446,625 B1 | | 9/2002 | Tinari |
| 7,527,711 B2 | | 5/2009 | Ciudaj |
| 2007/0084778 A1 | * | 4/2007 | St.Germain et al. ....... 210/321.6 |
| 2008/0149573 A1 | * | 6/2008 | Fein et al. ..................... 210/799 |

* cited by examiner

Primary Examiner — Duane Smith
Assistant Examiner — Thomas McKenzie
(74) Attorney, Agent, or Firm — Lowe Hauptman Ham & Berner, LLP

(57) ABSTRACT

A solar thermal system for the partial desalination of sea water and for generating electricity includes a mass of black top material such as asphalt or the like used in paving roadways, parking lots and the like. The system also includes a network of interconnected conductive conduits such as a serpentine array of copper tubing and a pump for pumping seawater through the copper tubing that is in contact with or surrounded by the black top or asphalt portion of a roadway. The asphalt layer acts as a black body for absorbing heat from the sun and converts solar energy to thermal energy.

2 Claims, 2 Drawing Sheets

SOLAR THERMAL SYSTEM FOR THE PARTIAL DESALINATION OF SEAWATER AND ELECTRICAL ENERGY

FIELD OF THE INVENTION

This invention relates to a solar thermal system for the partial desalination of sea water and more particularly to a solar system for the partial desalination of sea water while producing electrical energy and brackish water.

BACKGROUND FOR THE INVENTION

Numerous prior art patents have been issued on apparatus for collecting, storing and transferring solar heat energy. Such apparatus and/or systems typically employ two liquid systems, a hot water utilization system including a potable hot water storage tank having a cold water inlet and hot water outlet and a re-circulating solar heating fluid system including a solar collection panel, a gravity drain tank and a heat exchange coil. In one common form of such apparatus the solar energy is incident on and absorbed by a metallic plate or "black body", which effectively converts it to a black body type of radiator. The black body surface is encased within a transparent ceramic or plastic material that permits the transfer of light there through, but reflects back toward the heat absorbing black plate substantially all infrared radiation emitted by the black body plate. The heat developed in the black body is then transferred to a fluid which passes through copper tubes lined in an adjacent relationship to the black body heat absorbing plate.

One example of, a solar thermal water heating system is disclosed in Fossum et al U.S. Pat. No. 5,575,276. As disclosed therein, a solar thermal water heating system includes a solar collector unit, first and second heat exchangers, and a drain back tank, ordered respectively in vertically descending relation. The solar energy collector comprises a plurality of heat absorbing modules formed by deforming two plates into intimate contact with parallel metallic pipes disposed intermediate the plates. The uppermost surface of the pair of plates is provided with a black body coating to emit infrared radiation when sunlight is incident thereon. A glazing is provided over such black body surface to freely transmit incident light to the black body surface but to reflect infrared heat energy emitted by the black body surface. A pump for pumping fluid from the drain back tank to the solar collector unit is positioned horizontally adjacent the drain back tank. The first heat exchanger is vertically disposed within the water storage tank for conducting heat to potable water within the storage tank. When the system shuts down, the thermally conductive fluid drains into the first heat exchanger and drain back tank providing freeze protection for the solar collector unit.

The use of black top driveways, parking lots and the like in thermal heating systems are also well known. For example, Brugger U.S. Pat. No. 4,037,652 discloses a solar heat storage system and a solar heat collection mechanism wherein a plurality of conduits lying below street level are covered by a layer of blacktop. The collection mechanism includes a network of serially connected conductive conduits arranged in a serpentine fashion and coupled to a source of antifreeze.

An additional approach to the utilization of fluid containing conduits embedded in a roadway is disclosed in Wendel U.S. Pat. No. 4,132,074. As disclosed, the fluid circulated through the conduit is heated by the paving and cools the paving to prolong the useful life and can be used to reduce heat transmission through the roofing to the interior of a building. One example, refers to a heated swimming pool heated by a collector forming a part of a parking lot or generating electric power by use of a collector from a part of a highway.

A solar energy collection system is disclosed in Tinari U.S. Pat. No. 6,446,625. Tinari discloses a system that can be retro fitted into pavement covered lots with a pump and heat exchanger connected to and a conduit buried below the paved surface. The conduit has a hollow unitary, one-piece casting with an oval cross-section and an internal divider that divides the interior of a casing into two passageways. Heat conducted fins are mounted on the casing.

It has now been recognized that in some countries, summer temperatures may reach or exceed 50° C. (122° F.) in the shade and in those countries, it should be possible to utilize existing roads or newly constructed roads as heat engines due to their black body surface that can convert solar energy into thermal energy. For example, the high temperature during the day can be used to boil seawater pumped thorough a piping network and directing the pressurized steam into turbines to generate electric energy. Then as the steam cools down, the condensed water can be used as brackish water suitable for agriculture or can undergo further desalination to produce drinking water that is suitable for human consumption.

Thus, the ultimate aim of the present invention is to use an abundance of solar energy as an efficient, environmental friendly and cost effective energy alternative for water desalination and generation of electricity.

BRIEF SUMMARY OF THE INVENTION

A solar thermal system for the partial desalination of seawater while producing electrical energy and brackish water includes a mass of asphalt having an upper surface exposed to the sun and acting as a black body for heating by the direct rays of the sun. The system includes a network of conductive conduits such as a plurality of copper tubes interconnected in a serpentine manner under a layer of asphalt. Means are provided for pumping a mass of sea water through the network of conduits for conversion into pressurized steam by the heat from the heated asphalt. In addition, an electrical generator or multiple generators and means for conveying pressurized steam into the generator or generators to thereby produce electrical energy are also provided.

In addition to the above, condensing means for cooling the cooled sea water produces brackish water.

The invention will now be described in connection with the accompanying drawings wherein like reference numerals have been used to indicate like parts.

DESCRIPTION OF THE PREFERRED EMBODIMENTS OF THE INVENTION

Figure 1:
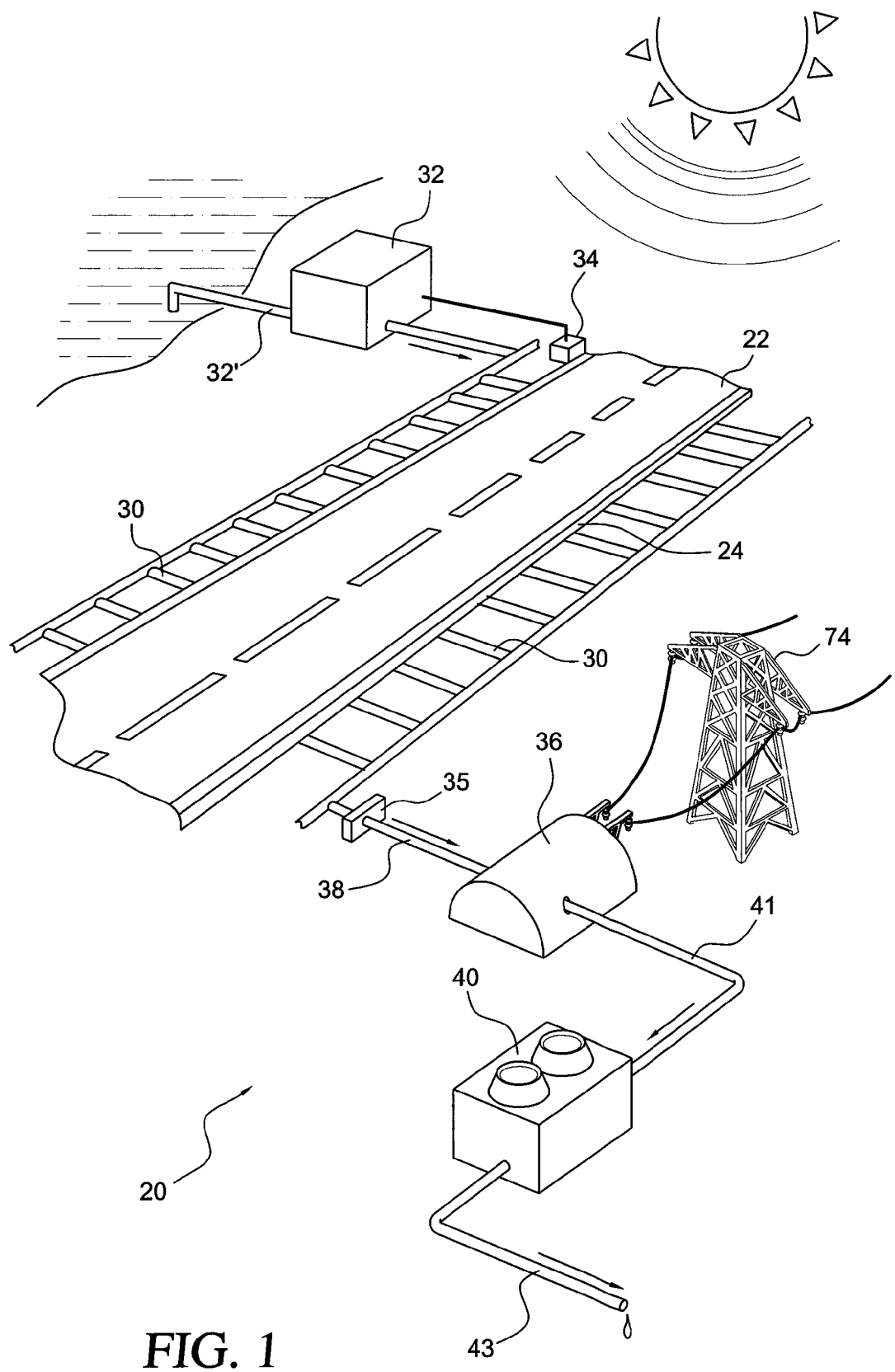
FIG. 1 is a schematic illustration of a solar thermal system for the partial desalination of sea water while producing electrical energy in accordance with the present invention.

The present invention advantageously employs a "black top" surface of a driveway, or parking lot or the like associated with a house or business as part of a solar water heating system. The "Black top" for purpose of the present invention is intended to mean a conventional petroleum derived oil and tar composition or alternatively an asphalt based composition that is naturally black and solar heat absorbing in character. A black top surface is exemplified as an over pavement for a plurality of heat conductive pipes preferably of copper. The pipes are intended to be laid down either before the black top is deposited thereover to form a roadway or street or may be mounted over an older street to be recovered in which case the pipes will be located intermediate the layers of black top. When a new street or parking area is being formed, it is preferred that the initial insulating medium of any conventional insulating material composition be deposited on the ground prior to the assembly of heat conductive pipes. The heat conductive pipes are preferably arranged in a zigzag or serpentine fashion along a common plane located directly beneath the black top overlay. The number of conductive pipes in the network, their length, diameter and their alignment will depend upon the climate, the orientation of the street under which the pipes are located and the surface area covering the network of pipes.

In other words, a solar system 20 for the partial desalination of sea water in accordance with the present invention includes a mass of asphalt such as a black top roadway 22 having an upper surface 24 that is exposed to direct rays of the sun. In practice the asphalt acts as a black body to absorb heat until it is sufficient to convert the liquid sea water into pressurized steam. The asphalt composition is a conventional mix of the type used in areas where summer temperatures in the shade equal or exceed 50° C. The solar system 20 also includes an array of interconnected conductive conduits 30 as for example copper tubes that are formed into a serpentine pathway (see FIG. 2).

The conduits 30 are connected to a source of sea water (not shown) by means of a liquid pump 32 of a conventional design that is adapted to pump sea water into the array of interconnected-conductive conduits 30. In a preferred embodiment of the invention, the network of interconnected copper tubes are disposed within the mass of asphalt between the upper and lower surfaces thereof and have a wall thickness that is capable of withstanding repeated passes by motor vehicles over the roadway without cracking the tubing.

A temperature sensor 24 senses the temperature of the asphalt in the roadway 22 and activates the sea water pump 32 when the temperature of the roadway 22 is sufficient to convert the liquid sea water into pressurized steam. A circuit for deactivating the pump when the temperature of the asphalt is insufficient to produce steam is conventional unit as will be well understood by persons of ordinary skill in the art.

The sea water pump 32 pumps the sea water from its source into and through the inner connected copper tubes whenever the temperature is sufficient so that the sea water is heated and converted to steam. The steam is fed to one or more turbines 36 by means of a pipe 38 to thereby cause the turbine to generate electricity. The cooling steam is then fed to a condenser 40 by means of a pipe 41 and brackish water is delivered via a pipe 43. The precipitated salt is removed from the conduits 30 during the night when temperature is low by increasing the pressure of the inlet sea water pump 32 to flush it out from a valve 35.

Figures 2, 3:
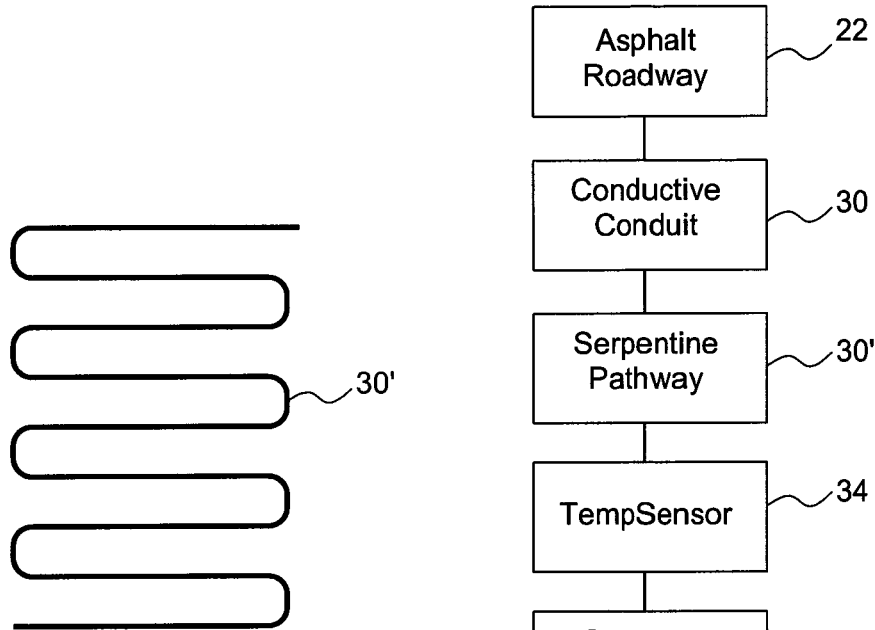
FIG. 2 is a schematic illustration of an inner connected conductive conduit as used in a solar thermal system in accordance with the present invention.
FIG. 3 is a flow chart illustrating the operation of a solar thermal system in accordance with the present invention.

Referring now to FIG. 3, areas with relatively hot summer temperatures as for example temperatures in excess of 50° C. in the shade can use an asphalt roadway 22 as a black body for absorbing heat from the direct rays from the sun. The roadway 22 has an upper and lower surface with the lower surface in contact with a conductive conduit 30 that extends under the roadway 22 and in contact therewith. In a first embodiment of the invention the conductive conduit 30 or serpentine pathway 30' (FIG. 2) of copper tubing is disposed between the upper and lower surfaces of the asphalt roadway for a sufficient length to generate steam.

A temperature sensor 34 at the distal end of the roadway 22 i.e. the end of the asphalt layer that is used to convert solar energy to thermal energy may be used to actuate and/or deactivate a sea water pump 32 for pumping sea water through the conduit 30 to thereby convert the liquid sea water to pressurized steam by absorbing heat from the asphalt roadway. The steam is fed to an input of one or more turbines to rotate the turbines to generate electrical energy. After passing through the turbine, or turbines the steam is fed into a condenser 40 and converted into brackish water.

With reference to FIG. 3 an electrical generating system includes a boiler for receiving hot water from an inlet pipe from the conduit 32'. This hot water is vaporized in a boiler and produces steam for driving a turbine or a turbo generator for generating electricity 37'. In some areas it may be desirable to include a heat source in the boiler to generate steam over longer periods of time. The generator delivers electricity to wires 74 while the water from a boiler returns to the conduit 32' through outlet piping. If desired an auxiliary water heater may be provided in parallel with the outlet piping and connected therewith to a valve so that heated water may be circulated through the conduit 32' for additional heat.

While the invention has been described in connection with its preferred embodiment it should be recognized that changes and modifications may be made therein without departing from the scope of the appended claims.

What is claimed is:

1. A solar thermal system for the partial desalination of sea water while producing electrical energy and brackish water, said system consisting of:
   a mass of an asphalt composition having an upper surface exposed to the sun and acting as a black body for heating by the direct rays of the sun light and a lower surface and in which said asphalt is a roadway of sufficient thickness and length for supporting a plurality of motor vehicles;
   a network of interconnected copper tubes forming a serpentine passage between said upper and said lower surface of said mass of asphalt;
   a liquid pump for pumping a mass of sea water through said network of copper tubes for conversion into pressurized steam by the heat in said mass of asphalt;
   an electrical generator and a pipe for conveying pressurized steam into said electrical generator to thereby produce electrical energy and a condenser and a second pipe for connecting said generator to said condenser for producing brackish water; and
   a temperature sensor for activating said liquid pump when the heat of said mass of asphalt is sufficient to produce steam and for disconnecting said liquid pump when the heat of said mass of asphalt is insufficient to drive said generator.

2. A solar thermal system for the partial desalination of sea water while producing electrical energy and brackish water consisting of:
   a mass of an asphalt composition having an upper surface exposed to the sun and acting as a black body for heating by the direct rays of the sun light and a lower surface and in which said asphalt is a roadway of sufficient thickness and length for supporting a plurality of motor vehicles;
   a network of interconnected copper tubes forming a serpentine passage between said upper and said lower surface of said mass of asphalt;

a liquid pump for pumping a mass of sea water through said network of copper tubes for conversion into pressurized steam by the heat in said mass of asphalt;

an electrical generator and a pipe for conveying pressurized steam into said electrical generator to thereby produce electrical energy and a condenser and a second pipe for connecting said generator to said condenser for producing brackish water; and a temperature sensor for activating said liquid pump when the heat of said mass of asphalt is sufficient to produce steam and for disconnecting said liquid pump when the heat of said mass of asphalt is insufficient to drive said generator; and which includes additional heating means for generating steam from the seawater.

\* \* \* \* \*